United States Patent
Vigliotti et al.

(10) Patent No.: US 6,641,775 B2
(45) Date of Patent: *Nov. 4, 2003

(54) REDUCING MANUFACTURING AND RAW MATERIAL COSTS FOR DEVICE MANUFACTURE WITH NANOSTRUCTURED POWDERS

(75) Inventors: Anthony Vigliotti, Tucson, AZ (US); Tapesh Yadav, Tucson, AZ (US); Clayton Kostelecky, Tucson, AZ (US); Carrie Wyse, Tucson, AZ (US)

(73) Assignee: NanoProducts Corporation, Longmont, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/001,660

(22) Filed: Dec. 3, 2001

(65) Prior Publication Data

US 2002/0063365 A1 May 30, 2002

Related U.S. Application Data

(62) Division of application No. 09/024,837, filed on Feb. 17, 1998, now Pat. No. 6,514,453.
(60) Provisional application No. 60/062,907, filed on Oct. 21, 1997.

(51) Int. Cl.$^7$ .......................... C04B 33/32; C04B 35/64
(52) U.S. Cl. ...................... 264/618; 264/614; 264/619; 264/620; 427/58; 427/126.1; 427/126.2; 427/123; 427/125; 427/79
(58) Field of Search ................ 264/614, 618, 264/619, 620; 427/58, 126.1, 126.2, 123, 125, 79

(56) References Cited

U.S. PATENT DOCUMENTS

| | | | | | |
|---|---|---|---|---|---|
| 5,223,186 | A | * | 6/1993 | Eastman et al. | |
| 5,358,722 | A | * | 10/1994 | Monzyk | 424/489 |
| 5,599,511 | A | * | 2/1997 | Helbe et al. | 264/12 |
| 5,900,223 | A | * | 5/1999 | Matijevic et al. | 423/263 |
| 5,952,040 | A | * | 9/1999 | Yadav et al. | 427/126.3 |
| 6,514,453 | B2 | * | 2/2003 | Vigliotti et al. | 264/618 |

* cited by examiner

*Primary Examiner*—James Derrington
(74) *Attorney, Agent, or Firm*—Stuart T. Langley; Hogan & Hartson LLP (57) ABSTRACT

Methods for lowering processing and raw material costs are disclosed. Specifically, the use of nanostructured powders is disclosed for faster and lower sintering temperatures whereby electrodes currently employing platinum can be substituted with lower melting point metals and alloys.

19 Claims, 9 Drawing Sheets

REDUCING MANUFACTURING AND RAW MATERIAL COSTS FOR DEVICE MANUFACTURE WITH NANOSTRUCTURED POWDERS

RELATED APPLICATIONS

The present application is a division of U.S. patent applications Ser. No. 09/024,837 entitled "THERMAL SENSORS PREPARED FROM NANOSTRUCTURED POWDERS" which was filed on Feb. 17, 1998, now U.S. Pat. 6,514,453 and claims priority to an earlier filed provisional application Ser. No. 60/062,907 entitled "Thermal Sensors Prepared from Nanostructured Powders" which was filed on Oct. 21, 1997.

BACKGROUND OF THE INVENTION

It is desirable for many different applications to monitor the temperature and the changes in the temperature of a medium. In particular, rapid monitoring of such changes is necessary and even required for many applications. For example, in engine environment monitoring and biomedical events monitoring, a response time of less than 5 seconds, or preferably less than 1 second is desirable. Applications requiring monitoring of radiation, power, heat and mass flow, charge and momentum flow, and phase transformation also demand rapid response times. Faster response times are, in general, the preferred performance even in applications that currently use devices that offer very slow response. For example, in ultra-precision manufacturing, temperature control is by far one of the most convenient methods of objective control structure. In machining at high speeds, the temperature of the tool or the substrate is a critical indicator of manufacturing efficacy; similarly welding, casting, milling, electrodischarge machining, chemical or laser etching of screens and stencils, bonding of dissimilar materials, lathe motor winding temperature, and related manufacturing equipment and processes are all thermally intensive, and the rapid sensing and control of temperature is critical to the end product quality. The response time of the thermal sensor determines the efficacy and the effectiveness of temperature control equipment for many applications including the monitoring of coolant and lubricant temperature before, during, and after an engine or motor operation, medical applications, icing of wings, phase transformations caused by physical or chemical effects, composition transformations caused by physical or chemical effects, the monitoring of pollution prevention units, exhausts, heaters, ovens, household apparatus, laboratory and industrial instruments, furnaces, and finally fire/heat detection and prevention systems.

The temperature of a medium is commonly monitored over a range using devices based on thermocouples, RTDs or thermistors. Thermocouples, by far the most common technique, are unsatisfactory in many applications as their response time is slow and often in the range of 30 to 500 seconds. RTDs are faster, however they are also unsatisfactory for applications that require rapid monitoring because their response time is 20 to 50 seconds even at higher temperatures. Of the known devices, thermistors are the best in their response times, but they are still limited to response times in the range of 5 to 25 seconds.

Thermistors are thermally sensitive resistors used in a variety of applications, including temperature measurement A thermistor is a piece of semiconductor made from metal oxides, pressed into a small bead, disk, wafer, or other shape, sintered at high temperatures, and finally coated with epoxy or glass. The resulting device exhibits an electrical resistance that varies with temperature. The two types of thermistors include: negative temperature coefficient (NTC) thermistors, whose resistance decreases with increasing temperature, and positive temperature coefficient (PTC) thermistors, whose resistance increases with increasing temperature. NTC thermistors are much more commonly used than PTC thermistors, especially for temperature measurement applications.

A main advantage of thermistors for temperature measurement is their high sensitivity. For example, a thermistor can have a sensitivity that is 10 or more fold higher than platinum-based RID which itself is about 3 to 10 fold more sensitive than thermocouples. The physically small size of the thermistor bead can also help yield a very fast response to temperature changes.

Another advantage of the thermistor is its relatively high resistance. Thermistors are available with base resistances (at 25° C.) ranging from hundreds to millions of ohms. This high resistance diminishes the effect of inherent resistances in the lead wires, which can cause significant errors with low resistance devices such as RTDs. For example, while RTD measurements typically require 3-wire or 4-wire connections to reduce errors caused by lead wire resistances, 2-wire connections to thermistors are usually adequate. The major tradeoff for the high resistance and sensitivity of the thermistor is its highly nonlinear output and relatively limited operating range.

One drawback of thermistors, however, is their use over limited temperature ranges. Thermistors have been used primarily for high-resolution measurements over limited temperature ranges, and one example of such an application is medical thermometry.

Another drawback to the use of thermistors is that, because of their small size and high resistance, they are prone to self-heating errors. When current is passed through the thermistor, power dissipated by the thermistor, equal to $I^2R$, will heat the thermistor. Manufacturers typically specify this as the dissipation constant, which is the power required to heat the thermistor 1° C. from ambient temperature (mW/C.). The dissipation constant depends heavily on how easily heat is transferred away from the thermistor, so the dissipation constant may be specified for different media. This phenomenon is the basis of application of thermistor devices for monitoring of power, heat and mass flow, of charge and momentum flow, and of phase transformation. Nevertheless, a stable and reproducible dissipation constant is required in various applications; a requirement which state of the art thermistors usually fail to offer.

In summary, the slow response time, limited temperature range, the high thermal mass, the self-heating errors are the most important limitations of thermistors. This invention teaches a method of overcoming these limitations. Although this invention describes NTC thermistors, it would be obvious to those skilled in the art that the rationale and method discussed applies to practice of PTC thermistors as well. Furthermore, the rationale and method described in detail later also offers practical insights for the design and practice of superior RTDs and thermocouples as well. The teachings can be used to develop such devices that are superior in response characteristics, sensitivity, resistivity, stability, miniaturization, thermal mass, sintering temperature, electrode costs, and sintering time. Finally, while it is conventional to use thermistor's resistance measurement for temperature monitoring, this invention's teachings can also be easily extended to any electrical property of a thermal sensor, including but not limited to capacitance, inductance, impedance, conductance, admittance, and loss factor.

SUMMARY OF THE INVENTION

Briefly stated, the present invention involves a method of reducing the sintering temperature of a device by providing nanostructured powders of the active material of the device. The device is prepared from the nanostructured powders, and sintered at a temperature that is at least 100° C. lower than the sintering temperature necessary for a device prepared from micron-sized powders.

DETAILED DESCRIPTION OF THE INVENTION

The presently claimed invention describes a method of rapidly monitoring the temperature of a medium and a method of preparing a quantum confined device that can enable such measurements. Specifically, the electrical properties or changes in electrical properties, such as impedance, of nanostructured thermal sensor devices is measured. The presently claimed invention also describes a device for rapidly monitoring changes in the temperature of a medium and a method for preparing a device for rapidly monitoring changes in the temperature of a medium. The invention can be used to monitor the absolute value of and changes in temperature of gases, inorganic and organic liquids, solids, suspensions and mixtures of one or more of the said phases. The invention can be used to monitor radiation, power, heat and mass flow, charge and momentum flow and phase transformations. The material compositions to be used in the presently claimed invention are nanostructured materials, i.e. materials whose domain size have been engineered to sub-micron levels, preferably to a dimension where size confinement effects become observable, and thus the electrical or thermal or both properties of the materials are modified.

Nanostructured materials (nanomaterials) are a novel class of materials whose distinguishing feature is that their average grain size or other structural domain size is below a critical characteristic length. In case the characteristic length is unknown or difficult to determine, a good rule of thumb is to use 500 nanometers as the characteristic length, and more preferably 100 nanometers as the critical characteristic length. Within this size range, a variety of confinement effects dramatically change the properties of the material. A property will be altered when the entity or mechanism responsible for that property is confined within a space smaller than the critical length associated with that entity or mechanism. The importance of nanostructured materials to this invention can be appreciated by considering the example of the mean free path of electrons, which is a key determinant of a material's resistivity. The mean free path in conventional materials and resistivity are related by:

$$\rho = mv_E/nq^2\lambda$$

where, $\rho$: resistivity m: mass of electron $v_E$: Fermi energy n: number of free electrons per unit volume in material q: charge of electron $\lambda$: mean free path of electron This equation assumes that the resistivity in the material is determined in part by the mean free path of electrons and that the electrons have a free path in the bulk. In nanostructured materials, the domain size is confined to dimensions less than the mean free path and the electron meets the interface of the domain before it transverses a path equal to the mean free path. Thus, if the material's domain size is confined to a size less than the mean free path, this equation is no longer valid (in a simplistic model, one could replace $\lambda$ with the domain size, but that replacement ignores the fact that confinement can also affect "n" and other fundamental properties). This insight suggests that unusual properties may be expected from devices prepared from materials with a domain size less than the mean free path of electrons. While the above argument is discussed in light of mean free path, it is important to note that the domain confinement effect can be observed even when the domain size is somewhat larger than the mean free path because: (a) "mean" free path is a statistical number reflecting a mean of path lengths statistically observed in a given material and, (b) in very fine materials, the interface volume is significant and all the free electrons do not see the same space, electrons closer to interface interact differently than those from the center of the domain. In the presently claimed invention, the devices are prepared from nanostructured materials with a domain size less than 5 times the mean free path of electrons in the given material, preferably less than the mean free path of electrons. In the event that it is difficult to theoretically compute the mean free path of the material under consideration, it is recommended that the domain size be less than 500 nanometers, and most preferably less than 100 nanometers.

In one aspect of the invention, a thermal sensor device is prepared from the abovementioned nanomaterials. For thermal sensors, the significance of using nanostructured materials can be further appreciated if the conductivity of semiconducting oxides is considered as shown in the equation for conductivity from hopping mechanism:

$$\sigma = P_a \cdot P_b \cdot \frac{2e^2}{ckt} \cdot v \cdot \exp\left(-\frac{q}{kT}\right)$$

$P_a$, $P_b$: probabilities that neighboring sites are occupied by desirable cations e: electronic charge n: frequency factor k: Boltzmann's constant T: temperature q: activation energy c: unit cell dimension The frequency factor and activation energy are a strong function of the microstructure confinement and therefore the conductivity of the same material can be very different in nanostructured form when compared with micron sized form.

Figure 1:
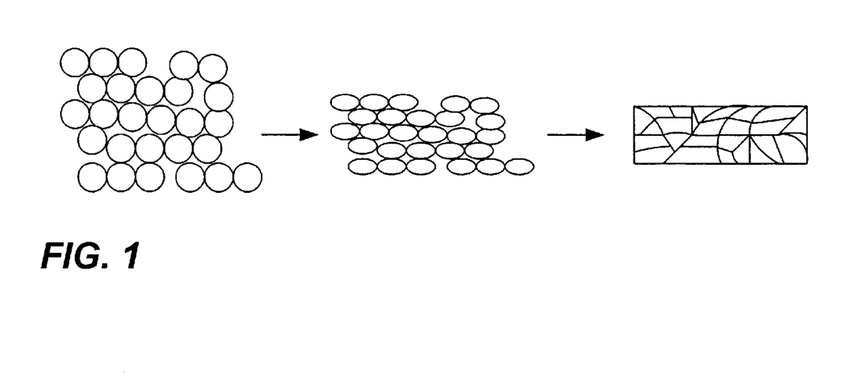
FIG. 1 depicts the effect of precursor size on the resistor layer thickness.

Device miniaturization is also a significant breakthrough that the presently claimed invention offers through the use of nanostructured materials. Existing precursors that are used to prepare thermistors are based on micron-sized powders. The thermal mass of the sensor is in part dependent on the powder size. FIG. 1 outlines the problem. As can be seen in FIG. 1, the layer thickness cannot be less than a few multiples of the precursor powder size. With nanostructured powders, the thermal sensor's active element size and therefore its thermal mass can be reduced significantly. For example, everything else remaining the same, the thermal mass of a thermistor can be reduced by a factor of 1000 if 10 nanometer powders are used instead of 10 micron powders. This method of reducing thermal mass is relevant to thermocouples, RTDs, thermistors, and devices where thermal mass is an important performance determinant. The presently claimed invention teaches that nanostructured powders are preferred to reduce the thermal mass of a device.

Preparation of Thermal Sensor Device

Figure 2:
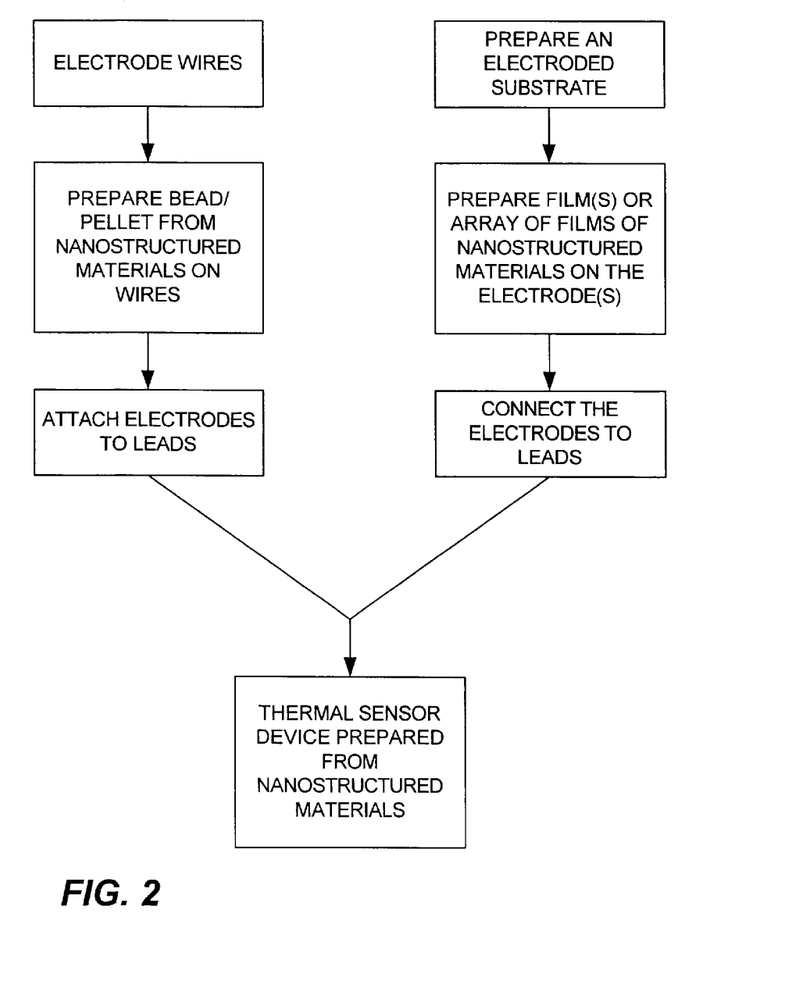
FIG. 2 depicts an illustrative method of preparing a thermal sensor device.

An illustrative method of preparing said device is shown in FIG. 2. The impedance of the device produced is capable of changing with the thermal state of or around the device. As a corollary, this invention requires that the device have a finite and detectable impedance in its initial as produced state. The impedance can be because of finite and detectable electrical property such as but not limiting to finite and detectable resistance, finite and detectable capacitance, finite and detectable inductance, or a combination of such properties.

The steps involved in forming the thermal sensor device include the formation of a thermal sensing material using nanostructured powders, formation of a structure that can support its own weight and retain its shape even when the environment changes, and finally electroding the structure. In an optional step, the sensing material can be sintered to increase the material's density and structural strength prior to or after the step of electroding the sensing material.

Figure 3:
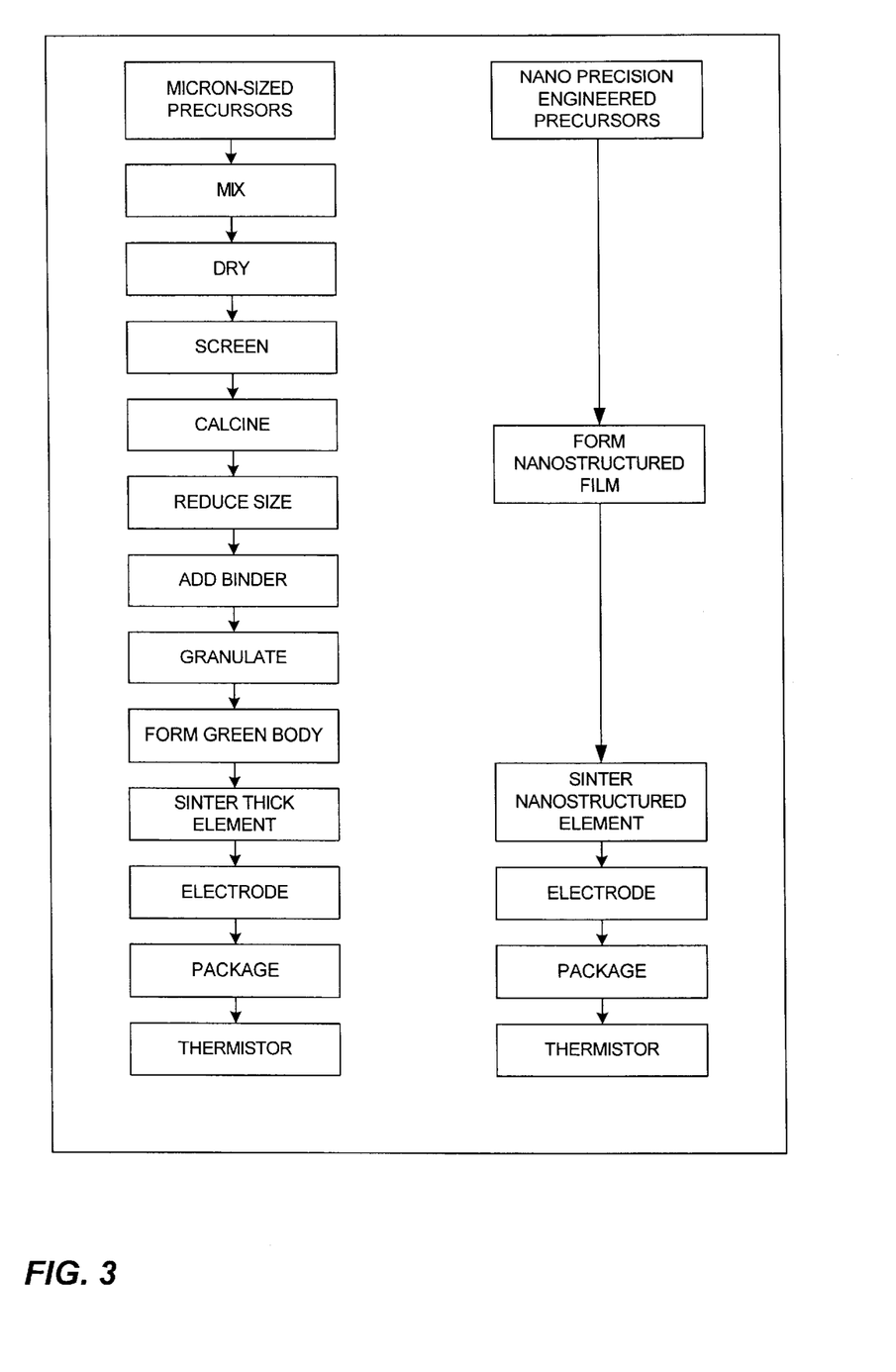
FIG. 3 depicts a comparison of the preparation of a conventional device prepared from micron sized precursors with the device of the presently claimed invention which uses nano-precision engineered precursors.

As discussed above, the material compositions to be used in the presently claimed invention are nanostructured materials, i.e. materials whose domain size have been engineered to sub-micron levels, preferably to nanoscale levels (i.e. less than 100 nanometers) where quantum confinement effects become observable. FIG. 3 illustrates the advantages of utilizing nano-precision engineered precursors in the method of the presently claimed invention.

The device can be produced from various thermally sensitive material compositions which include ceramics, metals and alloys, polymers, and composites. The ceramics include but are not limited to binary, ternary, quaternary, or polyatomic forms of oxides, carbides, nitrides, borides, chalcogenides, halides, silicides, and phosphides. Most preferably, the ceramics are oxides. The invention also includes stoichiometric and non-stoichiometric forms of ceramics, undoped and doped forms of ceramics, and different phases of the same composition. The ceramics used, however, are limited to ceramics that have a finite and detectable impedance and does not include ceramics and their forms that have an impedance higher than those currently detectable.

Metals and alloys such as those formed from a combination of two or more of s group, p group, d group and f group elements. The invention includes stoichiometric and non-stoichiometric forms of alloys, undoped and doped forms of metals and alloys, and different phases of the same composition. The metals and alloys, however, are limited to metals and alloys that have a finite and detectable impedance, and does not include metals and alloys or their forms that have impedance higher than those currently detectable.

Polymers including but not limited to those with functional groups that enhance conductivity. Specific examples include but are not limited to conducting polymers and ion-beam treated polymers. One of ordinary skill in the art will realize that other polymers such as metal filled polymers or conducting ceramic filled polymers can also be used. The polymers used, however, are limited to polymers or their forms that have a finite and detectable impedance and does not include polymers or their forms that have an impedance higher than those currently detectable.

Composites including but not limited to those formed from two or more metals, alloys, ceramics, or the polymers discussed above may also be used. Examples of illustrative composites include but are not limited to oxide-carbide composites, oxide-polymer composites, metal filled polymer composites, nitride-alloy composites, oxide-carbide-polymer composites. One of ordinary skill in the art will appreciate that other composites can also be used such as defect engineered composites. The composites are limited to composites that have a finite and detectable impedance and does not include composites that have an impedance higher than those currently detectable. While any of these material compositions can be used, it is preferred that those compositions be selected for device applications that provide log linear but high sloped voltage-current characteristics and resistance-temperature characteristics. In particular, compo sitions are preferred that yield a high value of the material constant (BETA value, beta value) as determined from:

$$\beta = \ln(R_1/R_2)/(1/T_1 - 1/T_2)$$

In this invention, a β value greater than 10 is desirable, above 100 is preferred, above 1000 is more preferred, and above 10,000 is most preferred.

An additional selection rule for the desired composition is the Temperature Coefficient of Resistance (TCR), a, which is defined for any material as the ratio of the rate of the change of resistance with temperature to the resistance at a specified temperature as depicted mathematically below:

$$\alpha = (1/R) \cdot (dR/dT)$$

where, R is the resistance of the thermistor at temperature T. For thermistors a is normally expressed in units of % per ° C. In the presently claimed invention, an a value greater than 0.01% per ° C. is desirable, above 0.1% per ° C. is preferred, above 1% per ° C. is more preferred, and above 10% per ° C. is most preferred.

Additionally, it is also preferred that the device contain ceramic compositions and it is more preferred to prepare devices containing oxide ceramic compositions as one of the constituents. It is most preferred to prepare devices containing oxide ceramic compositions based on one or more of the following elements: Ti, Mn, Fe, Ni, Zn, Cu, Sr, Y, Zr, Ta, W Sc, V, Co, In, Li, Hf, Nb, Mo, Sn, Sb, Ce, Pr, Be, Np, Pa, Gd, Dy, Os, Pt, Pd, Ag, Eu, Er, Yb, Ba, Ga, Cs, Na, K, Mg, Pm, Pr, Bi, Tl, Ir, Rb, Ca, La, Ac, Re, Hg, Cd, As, Th, Nd, Tb, Md, and Au, Al, Si, Ge, B, Te, and Se.

Once the appropriate nanomaterial composition has been selected, the thermal sensing material can be shaped in various forms including but not limited to a film, coil, rod, fiber, sphere, cylinder, bead, pellet, non-uniform shape or combination thereof. These shapes may also be in solid or hollow form, in monolithic or integrated form, in singular to array form, on non-flexible or no substrate, on inorganic or organic substrate. The thermal sensing material can be shaped into these various forms using one of the following manufacturing methods or a combination thereof including pressing, extrusion, molding, screen printing, tape casting, spraying, doctor blading, sputtering, vapor deposition, epitaxy, electrochemical or electrophoretic deposition, thermophoretic deposition, centrifugal forming, magnetic deposition, and stamping. The sensing material can be porous or dense, thin or thick, flat or curved, covered with a barrier or exposed.

In an additional aspect of the presently claimed method a substrate may be used, however, it is not required. It is necessary, however, to form a structure, as described above. In the event a substrate is used or preferred, the substrate on which electrodes are formed can be flat or curved, flexible or rigid, inorganic or organic, thin or thick, porous or dense. The preferred substrates are those that provide the mechanical properties needed for device life greater than the anticipated device usage life. The substrate should have sufficient strength and toughness to support its own weight and the weight of the device prepared on the device. The substrate should have thermal and mechanical shock resistance, i.e. sufficient strength and toughness to withstand the thermal stress (e.g. from expansion) or mechanical stress (e.g. vibration). The substrate should also have hardness and environmental resistance to prevent degradation of the device or itself or both over the expected usage of life of the device. For selectivity, one may integrate a resistive element in the substrate to warm the sensor to a desirable temperature to facilitate the interaction of the environment of interest during start up of the device. However, if the heating element is integrated, care must be taken to avoid shorting of the electrode or transmission of noise from the resistive element to the impedance signal from the electrode.

Figure 4:
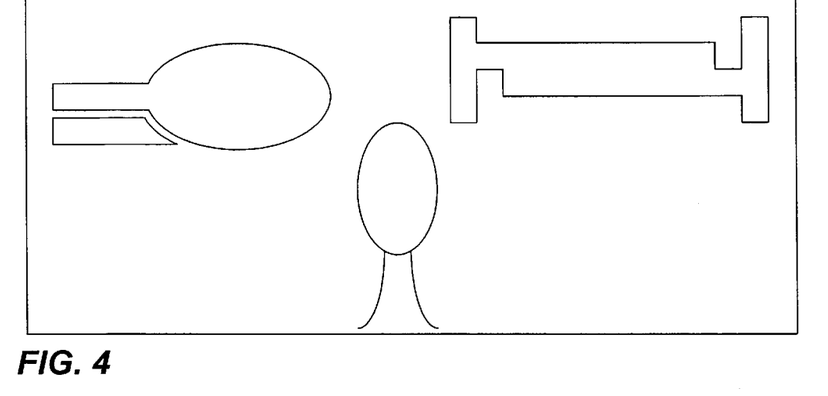
FIG. 4 depicts device architectures for thermistors.

In the final step of the presently claimed method, it is required that the device be electroded. The electrode can be a wire or plate or coil, straight or curved, smooth or rough or wavy, thin or thick, solid or hollow, and flexible or non-flexible. For device designs that prefer no substrate including but not limited to bead/pellet type device designs, it is preferred that the thermal sensor is formed directly on the electrode wire or plate or coil. It is important in all cases that the electrode be conductive and stable at the usage temperatures. It is preferred that the electrode composition does not react with the sensing material or the environment during the manufacture or use of the device. It is also preferred that the melting point of the electrode is higher than the highest temperature to be used during the manufacture or use of the device. FIG. 4 illustrates some examples of device architecture for thermistors. One of ordinary skill in the art will realize that other device architectures can also be used in the presently claimed invention.

Figure 5:
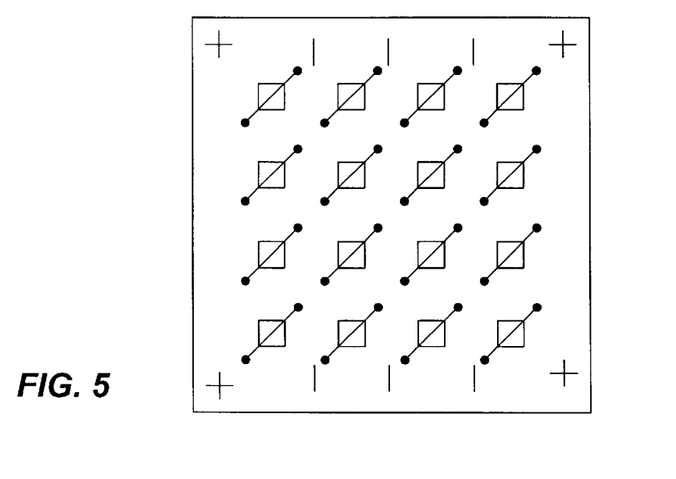
FIG. 5 depicts the parallel printing of sensor electrodes.
Figure 6:
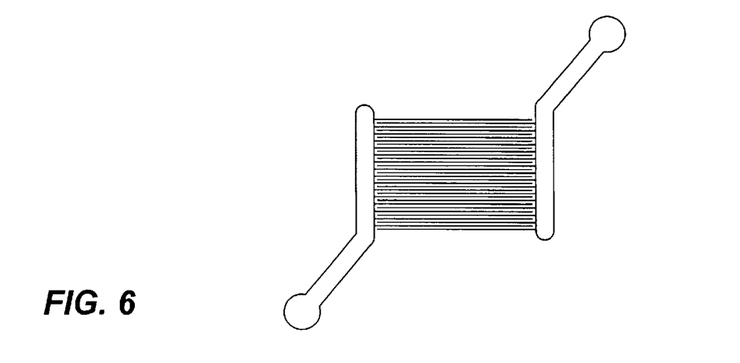
FIG. 6 depicts a sampler's electrode enlarged.

In one example, a sensor electrode can be built by a parallel screen printing technique. This approach has the advantage that it prints many sensors in parallel which can help dramatically reduce the cost per sampler element. As shown in FIG. 5, a mask layer is first formed. FIG. 6 shows one of the electrode structures enlarged. The interdigited pattern is chosen because the structure provides the maximal area for quick response. The structure is also inherently robust given the fact that even if one or more electrode fingers fail the sensor will still be functional. The edges of each electrode finger are rounded to minimize edge voltage related noise. The electrodes for the sampler are first prepared by obtaining a screen printing paste. The paste is then placed on a screen mask and imprinted onto the substrate using a squeegee. A semi-automatic screen printer is available to perform this task. The electrode layer is then dried and fired at 500° C. to remove any organics in the electrode. The nanostructured active sensing layers can then be deposited as described in Example 10. First nanoceramics are homogenized with screen printing pre-mix (cellulose, cyclohexanone). The thermistor films are next printed using the screen printing approach described above. Once printed, the films are then dried and then cured at 200° C. to eliminate any traces of organics in the film. Finally the nanopowders layer is sintered at 850° C. for 2 hours to stabilize the NTC ceramic film. The time and the temperatures for this thermal treatment can be varied to identify the conditions that minimize grain growth, provide robust and dense films, and best produce thermistor arrays with reproducible performance.

Additionally, in an optional step in the presently claimed method, the sensing material can be sintered to increase the material's density and structural strength. The sintering step can be performed before or after electroding of the substrate occurs. The sintering can be accomplished in an open or closed heating apparatus, in an oxidizing or reducing or inert environment, in flow or non-flow type heating apparatus, in a system that applies heat conductively or convectively or radiatively or a combination of these techniques, and with or without the application of external pressure during or before the application of heat. Some or all of the heat needed for sintering may be provided by internal heat such as those released during solid-state combustion of materials within the device.

The presently claimed invention also advantageously allows the device sintering temperature to be lowered. For example, if the device is utilizing platinum as the electrode material for the thermal sensor because of the high sintering temperature of the sensor's active material, then one approach of enabling the use of lower melting point metals or alloys for electrodes is by reducing the sintering temperature of the active material.

The densification of a powder compact or film, or the sintering of a powder compact or film, is essentially a process of removing the pores between the starting particles, combined with growth and strong bonding between adjacent particles. The driving force for densification is the free-energy change, or more specifically, the decrease in surface area and lowering of the surface free energy by the elimination of solid-vapor interface. Among the processing variables that may affect the densification process, the particle size of the starting powder is one of the most important variables. In solid-state processes, assuming that the matter transport is controlled by lattice diffusion, the densification rate or the volume change of the powder compact during sintering can be related to processing variables as follows:

$$\frac{\Delta V}{V_0} = \left[ 3 \left( \frac{20 \cdot \gamma \cdot a^3 \cdot D^0}{\sqrt{2} \cdot kT} \right) \cdot r^{-1.2} \cdot t^{0.4} \right]$$

where:
$V_0$: the initial volume of the powder compact,
$\Delta V$: the change of the volume during densification;
T: the sintering temperature
t: the sintering time
k: the Boltzman constant,
$D^0$: the self-diffusivity,
y: the surface energy of the particle,
$a^3$: the atomic volume of the diffusing vacancy,
r: the radius of the particle of the starting powder As can be seen from the equation, the densification rate is roughly proportional to the inverse of particle size. Given the same sintering temperature and starting material, the densification rate can be increased 1000 fold by using 10 nanometer sized powders instead of 10 micron sized powders. Alternatively, to obtain the same densification, the sintering can be conducted at lower temperatures starting with smaller sized powders. Thus, the use of nanoscale powders for sensing materials can also significantly decrease the sintering temperatures currently necessary for micron-sized powders. The decrease is greater than at least 100° C., more often between 100 and 500° C., and sometimes greater than 500° C., Additional advantages include the energy savings from lower processing temperatures and the reduction of processing times such as inventory costs.

An additional advantage is that because of the high surface area and high diffusivity of nanoscale powders, they may be sintered without impurity inducing sintering aids. The resulting product is thus more reliable and reproducible and have enhanced service temperatures and high temperature strength.

Use of the Thermal Sensor Device

Figure 7:
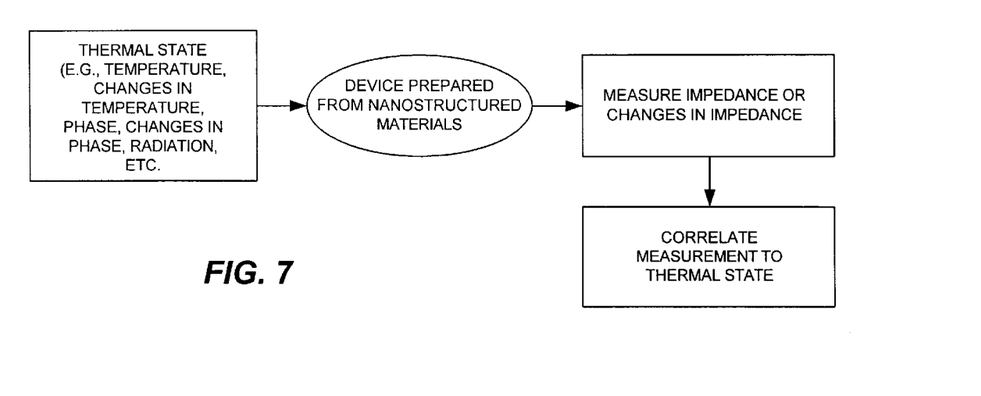
FIG. 7 depicts the method of rapidly monitoring the thermal state.
Figure 8:
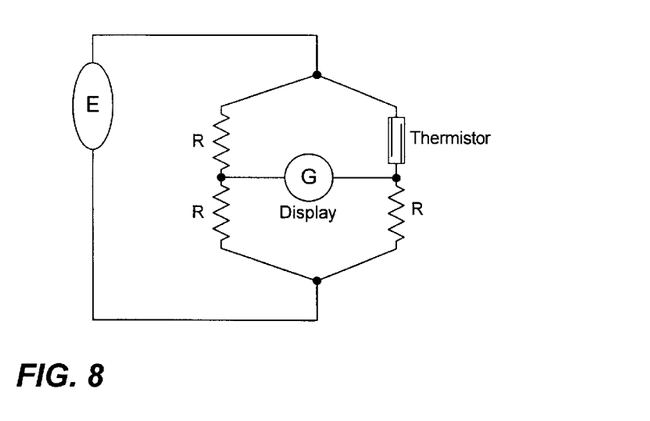
FIG. 8 depicts a thermistor in an illustrative circuit to measure temperature.

The presently claimed invention also describes a method for monitoring thermal state changes using a nanostructured thermal sensor device involving the steps of measuring the electrical property or the change in the electrical property using an electrical sensor device prepared from nanostructured materials and correlating the measurement of the electrical property to the thermal state. FIG. 7 depicts the approach of the presently claimed invention. The invention can be used to monitor absolute changes in the temperature of gases, inorganic and organic liquids, solids, suspensions and mixtures of one or more of the said phases. FIG. 8 shows an illustrative circuit that uses a thermistor as a temperature sensing device. Referring to FIG. 8, a potential "E" is applied to the wheatstone bridge which at a set point is balanced. The thermistor resistance and displayed galvanostat reading are calibrated at various temperatures. In an actual operating environment, any change in the thermistor temperature changes the thermistor's resistance which disturbs the bridge balance which is sensed and displayed. A simple calibrated ammeter or voltmeter can also be used to measure the resistance and calibrate the resistance to temperature of the thermistor corresponding to the measure thermistor resistance. The preferred method is the bridge method.

Figure 9:
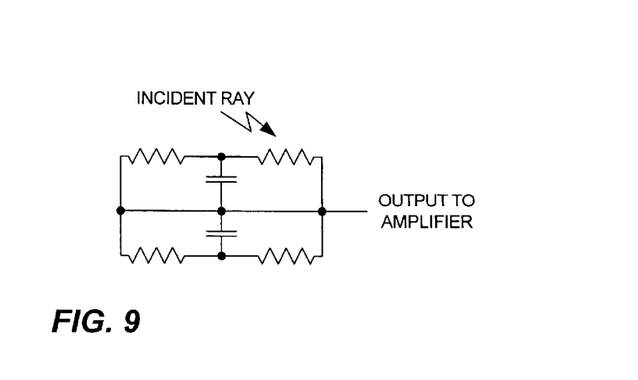
FIG. 9 depicts a typical thermistor bolometer detector circuit.

The presently claimed invention can also be used to monitor radiation, power, heat and mass flow, charge and momentum flow, and phase transformation. FIG. 9 presents an example where the thermistor is used in a bolometer detector circuit. The active and compensating thermistors are part of a bridge circuit as shown. Equal bias voltages of opposite polarity with respect to ground are applied across the elements to minimize noise and microphonics. With no radiation on the detector, the bridge remains unbalanced. Absorption of radiation causes a temperature rise, hence a resistance decrease in the detector element causing the bridge to become unbalanced. The out-of-balance signal is amplified and translated into an indicator and recorded. Applications of thermistor bolometers include radiometers, pyrometers, and non-destructive examination (NDE) of products.

For simplified signal processing, it is preferred that impedance measurements be performed at a single frequency or with d.c. For reliability, an array of sensing elements can be used, all of them working at the same frequency, or some of them working at different frequencies, or all of them working at different frequencies. Furthermore, the material of composition or operating temperature of each array element may be different. An array of elements can enable the measurement of temperature profiles over a space for a specified time or as a function of time.

In particular, the presently claimed invention can be used to monitor temperature changes while machining at high speeds, welding, casting, milling, electrodischarge machining, chemical or laser etching or screens and stencils, bonding of dissimilar materials, lathe motor winding temperature and other thermally intensive manufacturing equipment and processes. Similarly, the coolant and lubricant temperature before, during and after an engine or motor operation can be monitored, as well as monitoring temperature during the icing of wings, in medical applications, in phase transformation caused by physical or chemical effects, in composition transformations caused by physical or chemical effects, in the monitoring of pollution prevention units, exhausts, heaters, ovens, household apparatus, laboratory and industrial instruments, in furnaces, and in fire/heat detection and prevention systems.

Although the abovementioned examples are representative of the changes in temperature that can be monitored, one of ordinary skill in the art will appreciate that any changes in temperature can be monitored, as well as the absence of changes in temperature. It will also be appreciated that the presently claimed device can be used to rapidly monitor changes in radiation, flow of medium, and the state of the medium, as well as the absence of these changes.

It is preferred that the presently claimed invention rapidly monitor the above mentioned changes; in particular, is preferred that these changes are monitored in less than 5 seconds. It is most preferred if these changes are monitored in less than 1 second.

Applications of the Thermal Sensor Device

Sensors form the foundation for all control technologies and define the architecture, the layout, the performance, and the reliability for the control technology. The presently claimed thermal sensors enable more efficient, lower pollution, higher performance envelop operation of propulsion and power systems for combat vehicles, aircraft, and logistic support infrastructure. The fuel savings from dynamically controlled engines translates into significantly reduced costs per mission, lower weight for the same mission, more compact equipment, higher thrust to weight ratio, and greater range.

The presently claimed invention also has excellent potential for commercialization. For example, ultra-precision manufacturing requires the ability to rapidly detect, monitor, and evolve processing conditions. Temperature sensing is an excellent alternative and is currently used, albeit with slow response. Nanostructured thermistors will enable rapid response temperature sensing. Processes that will benefit include processes such as machining at high speeds, because the temperature of the tool or the substrate is a critical indicator of manufacturing efficiency; similarly improvements in welding, casting, milling, electrodischarge machining, chemical or laser etching of screens and stencils, and bonding of dissimilar materials will be improved.

Additionally, the miniature size of the nanostructured thermistors is ideally suited to detect small temperature differences. Thus, accurate temperature measurements can be made using the presently claimed thermistors.

Thermistor bolometers is another application of the presently claimed invention. Thermistor bolometers are used for infra-red detection in radiometers, pyrometers, automatic product analysis, spectroscopy, and automatic process control. Potential applications also exist in biomedical devices for thermal imaging, non-invasive patient care, and post-surgical monitor of skin grafts and organ transplants. Further applications include thermography for insulation check and structural integrity check of old buildings, bridges and homes. In space programs and missiles, the proposed technology offers the needed advantage of miniaturization and power-needs over cooled photodetectors.

Furthermore, another application is for microwave power measurement. As the frequency of an electromagnetic field increases, current and voltage measurements are impractical and error prone given the fact that the dimensions of the measurement instruments become a significant fraction of the wavelength of the electromagnetic field. Instead, power and impedance measurements are more appropriate. The proposed technology is perfectly suited for this application. As a microwave thermistor, the nano-engineered device proposed will enable fast response, broad band, high detectivity, and miniature instrumentation.

The currently described technology also has direct applications for power calorimetry in measuring particle beams because of the anticipated enhancements in sensitivity.

Additionally, the presently claimed invention can be used for liquid and gas flow detectors. The mass flow changes the environment of the thermistor and therefore the dissipation constant. The enhanced sensitivity of the proposed thermistors will enable the detection of small changes in liquid or gas flow. This can enable reliable flow detectors for process safety and control.

Finally, the presently claimed invention can also be used as a phase sensor. Once again, as described above, the change in the environment changes the thermal boundary conditions and the proposed thermistors can therefore be used to detect changes in phase (solid to liquid to gas), level of liquids, ice formation on walkways, bridges, and freezing of water lines to name a few.

In summary, the presently claimed invention enables the measurement of temperature, radiation, flow of a medium, and state of a medium. Additionally, changes or the absence of changes in temperature, radiation, flow of a medium, and the state of a medium can be monitored.

The presently claimed invention is described in detail in the following examples, however these examples are not intended to limit the scope of the invention.

EXAMPLES 1 THROUGH 8

Preparation of Sensors from $(Mn,Ni)_3O_4$ with $TiO_2$

Figure 10:
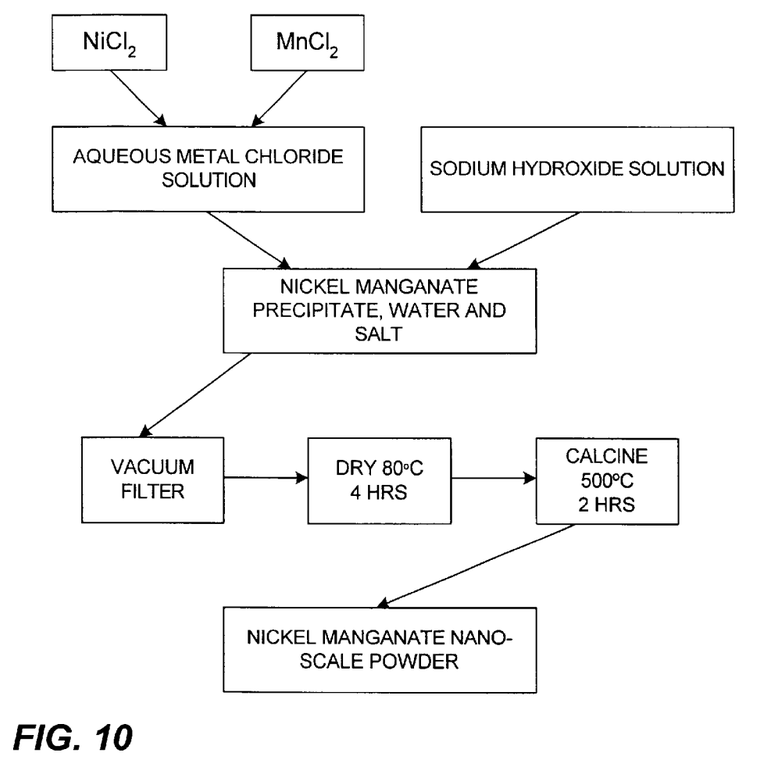
FIG. 10 depicts a flowchart for the preparation of nanoscale powders via chemical precipitation.

Nanoscale nickel-manganate powders were synthesized via a wet chemical precipitation method as outlined in FIG. 10. The starting composition mix of the precursors was adjusted to achieve a formulation of $Ni_{0.64}Mn_{2.36}O_4$, Nickel chloride is first put into solution under slight heat and stirred with a magnetic stir bar. Concentrated nitric acid was added until all hydroxide formed during the nickel chloride addition was completely dissolved. Manganese chloride was also put into solution and the two were mixed together and then slowly poured into one liter of a 1.25 molar solution of sodium hydroxide and a precipitate formed. The precipitate is then rinsed with distilled water in order to remove the aqueous salt solution while vacuum filtering in a 4000 ml filter flask. It was next dried and pulverized, and finally calcined in an alumina crucible. The color of the precipitate before it is dried is a greenish rust color and on drying becomes black.

Figure 11:
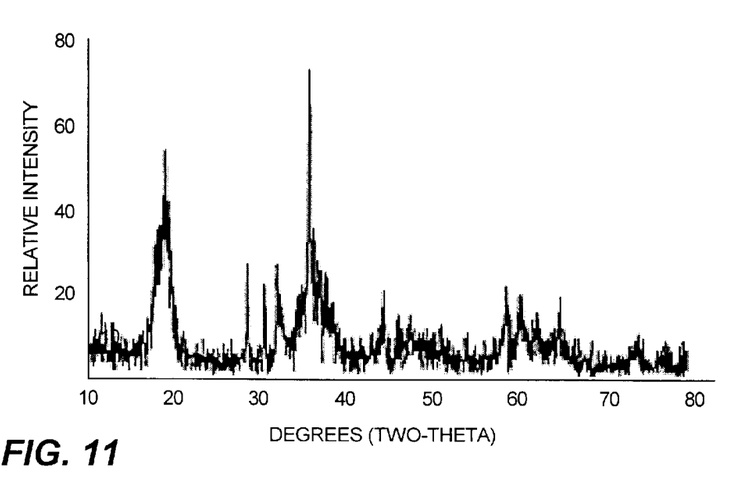
FIG. 11 depicts an XRD pattern of nanoscale $(Ni,Mn)_3O_4$ displaying peak broadening effects.

FIG. 11 is an XRD pattern from the precipitate powder illustrating the peak broadening associated with small crystalline size. The mean crystalline size (from Scherrer analysis) was 26 nm. BET analysis of the chemically produced nickel-manganate powders gave a specific surface area of 112 $m^2/g$. The composition at this point was considered to be an amorphous hydroxide, and calcination was done at 500° C. to crystallize the powder.

Figure 12:
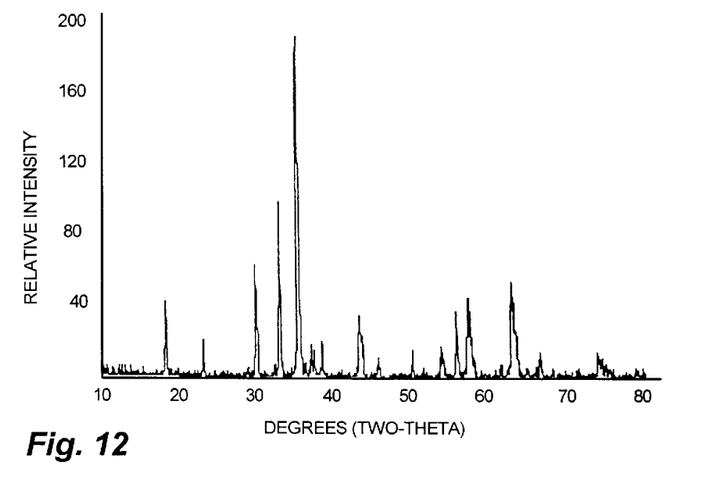
FIG. 12 depicts an XRD pattern of micron $(Ni,Mn)_3O_4$ calcined at 850° C. for 4 hours.

A standard oxide route was also used to make micron-sized powder of the same composition. Nickel(II) oxide (Aldrich) powders were used. The composition $NiO_{0.64}Mn_{2.36}O_4$ was batched accordingly and then ball-milled with zirconia media for 24 hours. The powder was dried at 80° C. and then calcined at 850° C. for four hours. FIG. 12 shows the XRD pattern for the calcined powder containing a spinel phase $(Ni,Mn)_3O_4$. A low value of specific surface area of 1.5 $m^2/g$ was as expected. The calcined powders were then charged into a metal die to produce pellets having a diameter of 6.4 mm and thickness of 2 mm. The pellets were then sintered in atmospheric air at 600, 800, 1000 and 1200° C. for one hour to produce thermistor elements.

Nanoscale $TiO_2$ was added to the $(Mn_5Ni)_3O_4$ composition to function as a sintering aid and to prevent cracking of the fired components. As $TiO_2$ is an insulating ceramic, it has the inherent drawback of raising the electrical resistivity and a satisfactory amount was determined empirically to be 5%. The same molar amount of micron-scale $TiO_2$, 5%, was also added to the micron scale composition to have comparative samples with which to relate resistance temperature characteristics of nanostructured materials based thermistor and micron powders based thermistor.

Figure 13:
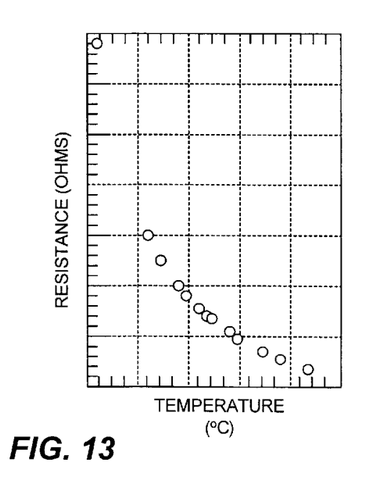
FIG. 13 depicts the resistance-temperature characteristics for thermistors formed from micron-scale powders, fired at 1075° C.
Figure 14:
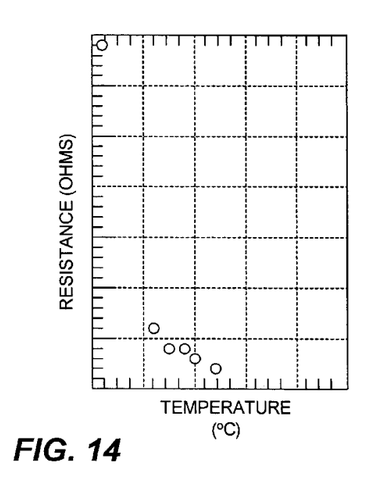
FIG. 14 depicts the resistance-temperature characteristics for thermistors formed from nano-scale powders, fired at 1075° C.

FIGS. 13 and 14 are the respective resistance temperature pilots for micron-and nanoscale thermistors fired to 1075° C. The nanoscale thermistor exhibits an extremely large change in resistance over a relatively short temperature range which is what is needed for high sensitivity.

Figure 15:
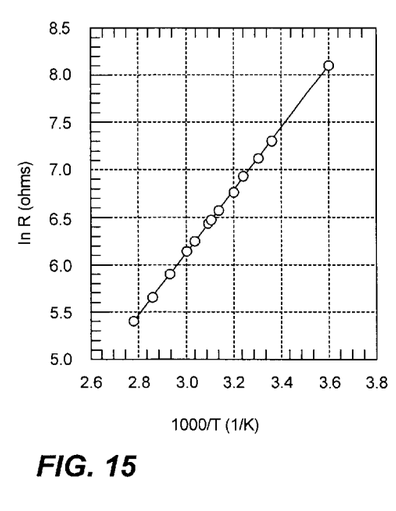
FIG. 15 depicts the characteristics response of a micron-scale thermistor, BETA of 3730K.
Figure 16:
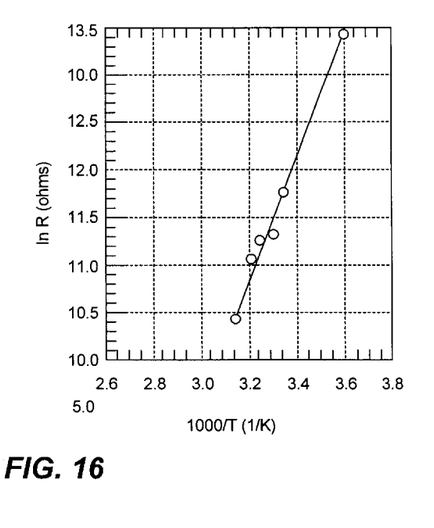
FIG. 16 depicts the characteristics response of a nanoscale thermistor, BETA of 6140K.

To obtain a quantitative comparison, these plots are then linearized with a natural log resistance versus the inverse of temperature graph and are shown in FIGS. 15 and 16. The steepness of the slope indicates the rate at which the resistance changes. The value of the slope is also termed the Material Constant, or $\beta$ value.

The raw data for compositions with and without $TiO_2$ additions, and fired at several different temperatures were analyzed in the above manner and the results are tabulated in Table 1 below:

TABLE 1

| Sample | Firing Temperature | Material Constant $\beta$ (K) | Correlation Coefficient | Resistivity (ohm-m) |
| --- | --- | --- | --- | --- |
| M7 1040 | 1040 | 3520 | 0.99995 | 278 |
| M71075 | 1075 | 3630 | 0.99998 | 272 |
| N7 1040 | 1040 | 3810 | 0.99761 | 980 |
| N7 1075 | 1075 | 6140 | 0.98886 | 2,850 |
| M8 1040 | 1040 | 3480 | 0.99806 | 54 |
| M8 1075 | 1075 | 3590 | 0.99942 | 160 |
| N8 1040 | 1040 | 7204 | 0.99682 | 8,210 |
| N8 1075 | 1075 | 4160 | 0.99816 | 12,900 |

A remarkably high value of the material constant $\beta$ exists for each of the nanocompositions, with those being almost twice that of the same composition thermistor formed from micron powders.

EXAMPLE 9

(YSr) (CrFe)O3 Based Thermal Sensor

Figure 17:
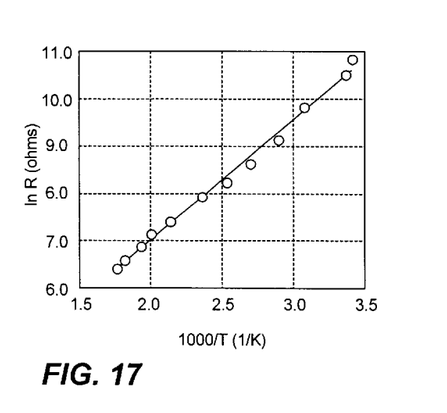
FIG. 17 depicts the performance of nanoscale (YSr) $(CrFe)O_3$ based thermal sensor.

A nanoscale thermistor formulation based on the perovskite system $(Y_{1-x}Sr_x)(Cr_{1-y}Fe_y)O_3$, was produced via a wet chemical precipitation reaction from the constituent metal nitrates when x=0.05 and y=0.20. In a 600 ml beaker, 3.63 g yttrium nitrate hexahydrate, 0.106 g strontium nitrate, 3.20 g chromium (III) nitrate, and 0.808 g iron were dissolved in 150 ml of distilled water. A one molar solution of sodium hydroxide was then added until the reaction was completed. The precipitate was then vacuum filtered and rinsed with distilled water and then denatured alcohol. The precipitate cake was then dried at 100° C. for 12 hours and calcined at 500° C. for one hour. The powder was next pressed to form pellets 6.40 mm in diameter by 5 mm in thickness. They were fired at 20° C./min to 600° C. for 0.5 hr, 55° C./min to 1100° C. for 0.5 hr., and 60° C./min to room temperature. The pellets were then tested electrically to determine their thermistor characteristics. FIG. 17 presents the results. The results as shown in FIG. 17 indicate a high value which suggests that the thermal sensor prepared from nanoscale ceramic composites can enable the rapid sensing of high temperatures.

EXAMPLE 10

Thick Film Thermistor Fabrication

The thermistor arrays were fabricated by screen printing using a semi-automatic screen printer. The screens used were made from stainless steel having a mesh count of 200, a wire diameter of 0.0007 inches, a bias of 45 degrees, and a polymeric emulsion of 0.0002 inches. Electrodes of Ag/Pd (Electro Science Laboratories #D-9633-G) were first screen printed on 96% alumina substrates (Accu-Tech Laser Processing, Inc.) having a thickness of 0.025 inches, and then fired in air at 850° C. for 10 minutes. A thermistor ink layer was next applied on top of the electrodes. It was made from thoroughly mixing nano-scale thermistor powders formulations and Electro-Science Laboratory, Inc, Screen printing vehicle #400. The thermistor formulations were e of $(Mn,Ni)_3O_4$ with and without additions of Ti and Cu. After printing, the ink is allowed to level for 10 minutes, is then dried at 350° C. for 12 minutes and then is fired at 850° C. for 12 minutes. The thick film thermistors that have been printed onto several electrode configurations.

Figure 18:
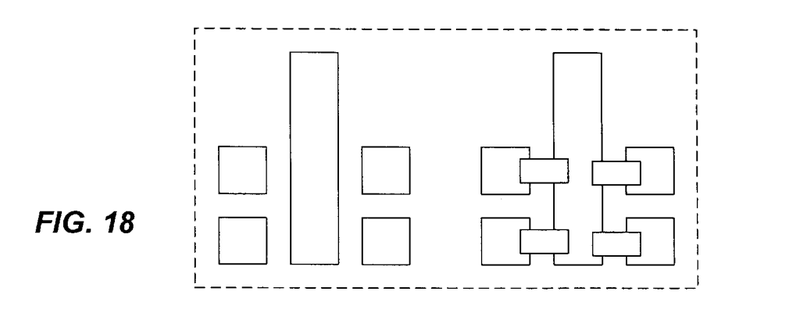
FIG. 18 depicts the screen printed thermal sensor array on an Ag—Pd electrode.
Figures 19, 20:
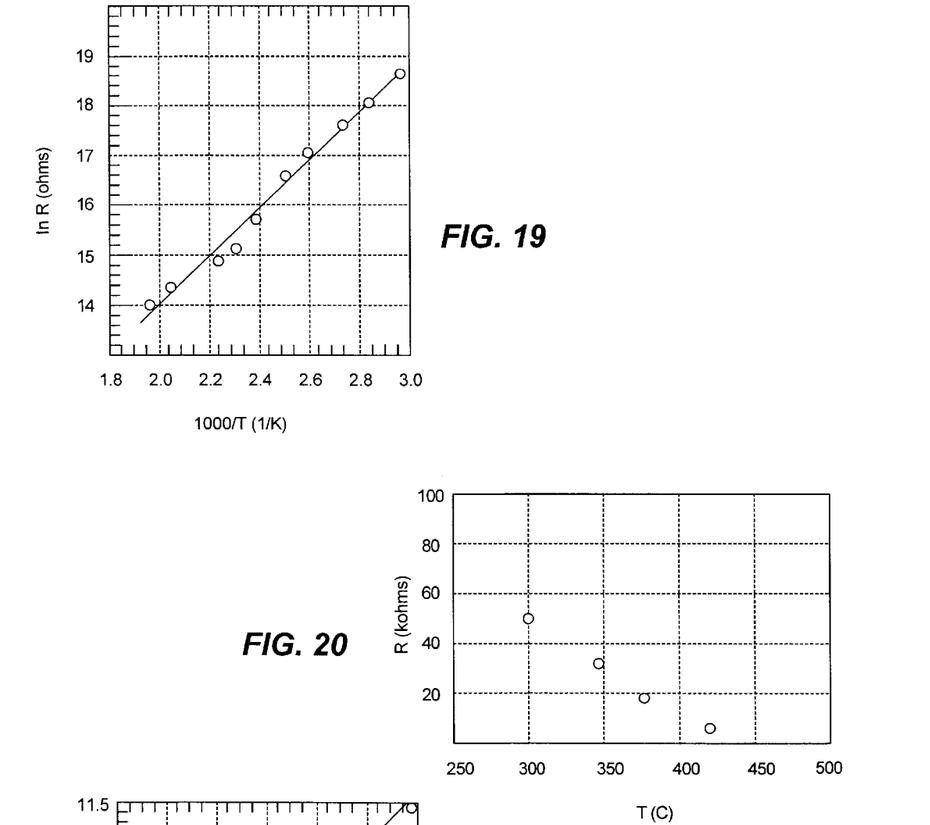
FIG. 19 depicts the resistance temperature characteristics for a thermistor array displaying a high BETA value of 4923K.
FIG. 20 depicts an interdigital device composed of $SnO_2$ displaying a negative change in resistance with temperature.

Thermistor Array: The following electrode array pattern shown in FIG. 18 was prepared using the above screen printing approach. Resistance-temperature measurements of the arrays were taken to establish a baseline. Values from four arrays, (16 thermistors total), were averaged, and the material constant calculated from the plot is shown in FIG. 19. The BETA values of the thermistors measured at room temperature had an average of 4923K and a standard deviation of 30K. Once again, the high beta value confirms that the thermal sensor is more sensitive.

Another way of stating these results is from the standpoint of the TCR value, or the alpha value, where $$\alpha = -\beta/T^2 (\%/C.)$$

At room temperature, therefore, a thermistor having a $\beta$ of 4923K would have an alpha value of −5.5%/C. which is extremely sensitive.

EXAMPLE 11

Preparation of Nanoscale $SnO_2$ Based Thermal Sensor

Figure 21:
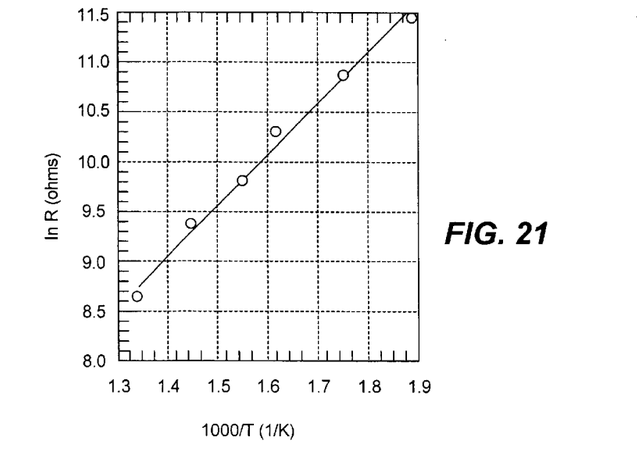
FIG. 21 depicts the resistance-temperature characteristics for a thick film thermistor element on interdigital electrodes with a BETA value of 4910K.

Nanoscale $SnO_2$ was screen printed over an interdigital pattern as explained above with the substitution of nanoscale tin oxide instead of the powder mix used before. The resistance-temperature characteristics are shown in FIG. 20 and the material constant has been determined from the In R versus the inverse of temperature plot in FIG. 21 to be 4910K. This would correspond to a TCR of 1.65%/° C. at 250° C.

EXAMPLE 12

Preparation of Thermal Sensors from Nanoscale $Y_{0.9}Zr_{0.1}$Oxide

Nanoscale $Y_{0.9}Zr_{0.1}$ oxide powder was produced via the following wet chemical precipitation reaction:

$$0.9Y(NO_3)_{3.6}H_2O + 0.1ZrOCl_{2.8}H_2O + NH_4OH \rightarrow 0.5(Y_{0.9}Zr_{0.1})_2O_3$$

Figure 22:
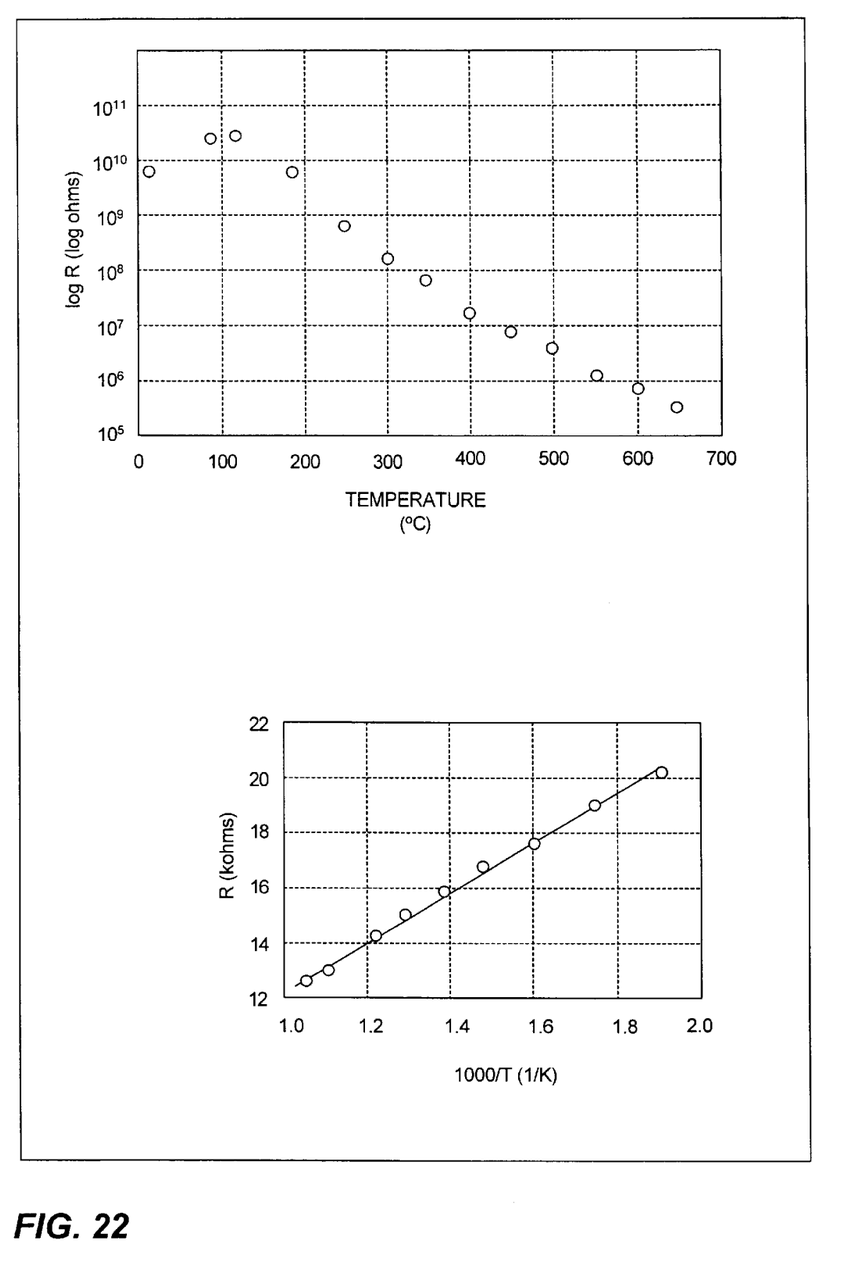
FIG. 22 depicts the response of a high temperature sensor.

After precipitation, the material was rinsed three times with hot distilled water. The powders were then dried at 100° C. for 12 hours, and then calcined at 500° C. for one hours. XRD analysis determined the average crystalline size to be about 9.4 nm. BET analysis established the specific surface area to be 80.4 m$^2$/g. The powders were then compressed into pellets 6.4 mm in diameter by 2 mm in thickness. They were electroded with Ag-Pd, and wired with Ag wire for electrical testing. FIG. 22 presents the response. A large beta value of 9292 was observed and the response was logarithmically linear from 200° C. to about 1000° C. This suggests that nanoscale powders can help produce a very high sensitivity thermal sensor for high temperature applications.

What we claim is:

1. A method of reducing the sintering temperature of a device, comprising:

providing nanostructured ceramic powders of the active material of the device;

preparing the device from the nanostructured ceramic powders wherein the nanostructured device has a domain size of less than 100 nm and the device comprises at least one metal electrode and at least one active layer; and, sintering the device at a temperature that is at least 100° C. lower than the sintering temperature necessary for a device prepared from micron-sized powders of the active material.

2. The method of claim 1 wherein the temperature is between 100° C. and 500° C. lower than the sintering temperature necessary for a device prepared from micron-sized powders.

3. The method of claim 1 wherein the temperature is greater than 500° C. lower than the sintering temperature necessary for a device prepared from micron-sized powders.

4. The method of claim 1 further comprising forming an electrode comprising a low melting point metal on the device prior to sintering, wherein the low melting point metal comprises a material having a melting point below the high melting point metal necessary for a device prepared from micron-sized powders of the active material because of high sintering temperature of the active material.

5. The method of claim 4 wherein the high melting point metal comprises platinum.

6. The method of claim 1 wherein the sintering is performed with lower levels of sintering aids than levels necessary for a device prepared from micron-sized powders.

7. The method of claim 1 wherein the sintering time required is less than sintering time necessary for a device prepared from micron-sized powders.

8. The method of claim 1 wherein the device exhibits domain confinement effects.

9. A method of preparing a quantum confined device comprising:

providing nanostructured ceramic materials with domain sizes where size confinement effects become observable, wherein the size confinement modifies the material properties from the group comprising thermal properties and electrical forming and sintering a device component with domain sizes less than 100 nm comprising the nanostructured ceramic materials, the device component comprising at least one metal electrode and one active layer, and the resulting device exhibits domain confinement effects.

10. The method of claim 9 wherein the forming step comprises sputtering.

11. The method of claim 9 wherein the forming step comprises vapor deposition.

12. The method of claim 9 wherein the forming step comprises electrochemical deposition.

13. The method of claim 9 wherein the forming step comprises electrophoretic deposition.

14. The method of claim 9 wherein the forming step comprises spraying.

15. The method of claim 9 wherein the forming step comprises stamping.

16. The method of claim 9 wherein the nano structured materials comprise chalcogenide.

17. The method of claim 9 wherein the nanostructured materials comprise nitride.

18. The method of claim 9 wherein the nanostructured materials comprise boride.

19. The method of claim 9 wherein the nanostructured materials comprise carbide.

* * * * *